(12) United States Patent  
Sundrani

(10) Patent No.: US 8,478,938 B2  
(45) Date of Patent: Jul. 2, 2013

(54) PERFORMING DATA WRITES IN PARITY PROTECTED REDUNDANT STORAGE ARRAYS

(75) Inventor: Kapil Sundrani, Bangalore (IN)

(73) Assignee: LSI Corporation, Milpitas, CA (US)

( * ) Notice: Subject to any disclaimer, the term of this patent is extended or adjusted under 35 U.S.C. 154(b) by 306 days.

(21) Appl. No.: 12/914,458

(22) Filed: Oct. 28, 2010

(65) Prior Publication Data

US 2012/0110377 A1 May 3, 2012

(51) Int. Cl.
*G06F 13/00* (2006.01)
*G06F 13/26* (2006.01)

(52) U.S. Cl.
USPC .................. 711/114; 711/155; 711/E12.002

(58) Field of Classification Search
USPC .................. 711/114, 155, E12.002
See application file for complete search history.

(56) References Cited

U.S. PATENT DOCUMENTS

| | | | |
|---|---|---|---|
| 5,388,108 A | 2/1995 | DeMoss et al. | |
| 2008/0109602 A1* | 5/2008 | Ananthamurthy et al. | ... 711/114 |
| 2009/0106493 A1* | 4/2009 | Tsuji | ............ 711/114 |

* cited by examiner

*Primary Examiner* — Edward Dudek, Jr.
(74) *Attorney, Agent, or Firm* — Suiter Swantz pc llo

(57) ABSTRACT

A first and a second physical disk identifier, a physical Logical Block Address (LBA), a data length, and a span identifier are calculated from a data write operation. A first request command frame is created for retrieving the existing data block from the storage array, the first request command frame including at least one of the calculated parameters. At least one second request command frame is created for retrieving the at least one existing parity data block from the storage array, the at least one second request command frame including the calculated at least one second physical disk identifier and at least one of the calculated parameters. At least one new parity data block is calculated utilizing the existing data block, the new data block, and the at least one existing parity data block.

18 Claims, 4 Drawing Sheets

PERFORMING DATA WRITES IN PARITY PROTECTED REDUNDANT STORAGE ARRAYS

TECHNICAL FIELD

The present disclosure generally relates to the field of Redundant Array of Independent Disk (RAID) storage systems, and more particularly to a system, method, and product for performing data writes to RAID arrays utilizing parity information.

BACKGROUND

In RAID storage systems utilizing parity information, data writes require a series of data reads, data modifications, and data writes. Each of these tasks requires multiple commands and calculations. Recent developments in storage device technologies have lowered access times so the limiting factor in overall RAID storage system performance has shifted from the storage devices of the system to the system controller. Therefore, there is a need to increase performance of the various tasks executed by a RAID storage system controller to increase overall performance of the RAID storage system.

SUMMARY

A method for performing a data write operation in a storage array utilizing a Redundant Array of Independent Disks (RAID) configuration with parity information includes, but is not limited to calculating a first physical disk identifier, a physical Logical Block Address (LBA), a data length, and a span identifier from the data write operation; creating a first request command frame for retrieving the existing data block from the storage array, the first request command frame including at least one of the calculated first physical disk identifier, the calculated physical LBA, the calculated data length, and the calculated span identifier; calculating at least one second physical disk identifier from the data write operation; creating at least one second request command frame for retrieving the at least one existing parity data block from the storage array, the at least one second request command frame including the calculated, at least one second physical disk identifier and at least one of the calculated physical LBA, the calculated data size, or the calculated span identifier; and calculating at least one new parity data block utilizing the existing data block, the new data block, and the at least one existing parity data block.

A system for performing a data write operation in a storage array utilizing a RAID configuration with parity information includes, but is not limited to, means for calculating a first physical disk identifier, a physical LBA, a data size, and a span identifier from the data write operation; means for creating a first request command frame for retrieving the existing data block from the storage array, the first request command frame including at least one of the calculated first physical disk identifier, the calculated physical LBA, the calculated data size, and the calculated span identifier; means for calculating at least one second physical disk identifier from the data write operation; means for creating at least one second request command frame for retrieving the at least one existing parity data block from the storage array, the at least one second request command frame including the calculated at least one second physical disk identifier and at least one of the calculated physical LBA, the calculated data size, or the calculated span identifier; and means for calculating at least one new parity data block utilizing the existing data block, the new data block, and the at least one existing parity data block.

A non-transitory computer-readable medium having computer-executable instructions for performing a method for performing a data write operation in a storage array utilizing a Redundant Array of Independent Disks RAID configuration with parity information, the method including, but not limited to calculating a first physical disk identifier, a physical LBA, a data size, and a span identifier from the data write operation; creating a first request command frame for retrieving the existing data block from the storage array, the first request command frame including at least one of the calculated first physical disk identifier, the calculated physical LBA, the calculated data size, and the calculated span identifier; calculating at least one second physical disk identifier from the data write operation; creating at least one second request command frame for retrieving the at least one existing parity data block from the storage array, the at least one second request command frame including the calculated at least one second physical disk identifier and at least one of the calculated physical LBA, the calculated data size, or the calculated span identifier; and calculating at least one new parity data block utilizing the existing data block, the new data block, and the at least one existing parity data block.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
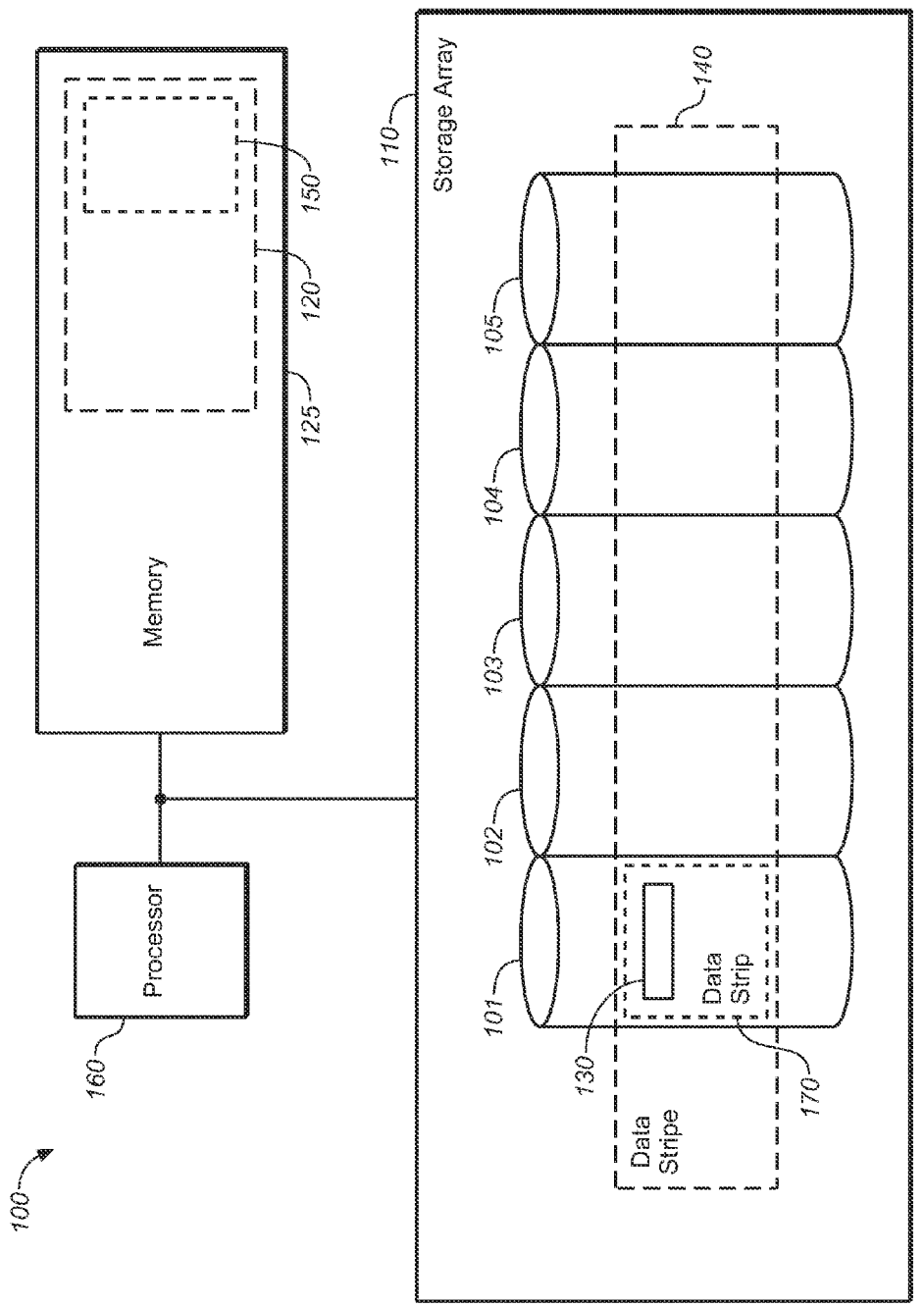
FIG. 1 is a block diagram of a RAID storage system in accordance with the present disclosure.

Referring generally to FIG. 1, a storage system 100 including a storage array 110 utilizing a Redundant Array of Independent Disks (RAID) configuration with parity protection is shown. Storage array 110 consists of 5 disks 101-105 in a RAID-5 configuration; however, other RAID configurations including various numbers of disks, parity schemes (ex—distributed parity, dedicated parity), and hybrid configurations (ex—RAID50) are contemplated by the current disclosure.

The storage system 100 may include a write through buffer 120. Write through buffer 120 may be comprised of Random Access Memory within storage system 100. Write through buffer 120 may be statically allocated from a larger system memory 125 of storage system 100 at the time of creation of storage array 110. System memory 125 may be operably coupled to storage array 110 for data communications. The size of write through buffer 120 may be determined based on a strip size of storage array 110, a RAID configuration of storage array 110, a selected number of simultaneous Input/Output (I/O) requests required for maximum performance of the storage system 100, and a number of buffers required for a data write to storage array 110. For example, in a RAID-5 array, a data write may require a first buffer to store the existing data, a second buffer to store the new data, and a third buffer to store the old parity data. Calculating the new parity data may include overwriting one or more of the data stored in the first, or third buffer, and therefore may not require a separate buffer. In an additional example, in a RAID-6 array, a data write may require a first buffer to store the existing data, a second buffer to store the new data, a third buffer to store the first existing parity data, and a fourth buffer to store the second existing parity data.

Generally speaking, the following equation may calculate the size of write through buffer 120:

$$\text{write through buffer size} = \text{strip size} \times \text{required number of buffers} \times \text{number of simultaneous requests}$$

The strip size may represent the largest quantity of data in a single data write. For example, a RAID-5 array may have a 64-kilobyte strip size. The selected number of simultaneous I/O requests required for maximum performance of the storage system 100 may be set at 128 outstanding requests. A RAID-5 array requires 3 buffers for a data write. Thus, according to the above equation, 24 megabytes of memory may be allocated for write through buffer 120.

Storage array 110 may include a plurality of data stripes. Each data stripe may include a plurality of data strips. A data strip (ex—data strip 170) may refer to the portion of a data stripe (ex—data stripe 140) within a single disk of storage array 110. A data write to storage array 110 may write 4 kilobytes of data to location 130 within disk 101. Data stripe 140 of storage array 110 may contain location 130. Storage system 100 may require calculation of new parity data in order to perform a data write to storage array 110. For a RAID-5 array, calculation of new parity data requires the new data to be written, the existing data of location 130 where the new data will be written, and the existing parity data corresponding to the existing data of location 130. For example, storage system 100 may calculate the new parity data via performing a bitwise Exclusive-OR (XOR) operation on the new data to be written, the existing data of location 130, and the existing parity data corresponding to the existing data of location 130. Storage system 100 may allocate contiguous buffer 150 within write through buffer 120 for storage of the data required for calculation of corresponding parity data for a data write to storage array 110. The size of contiguous buffer 150 may depend upon the size of the data write and the number of buffers required for a data write to storage array 110. For example, the size of contiguous buffer 150 may be calculated via the product of the size of the data write and the number of buffers required for a data write to storage array 110. For example, storage system 100 may allocate a contiguous buffer 150 of 12 kilobytes for performing a data write of 4 kilobytes requiring 3 buffers.

Figure 2:
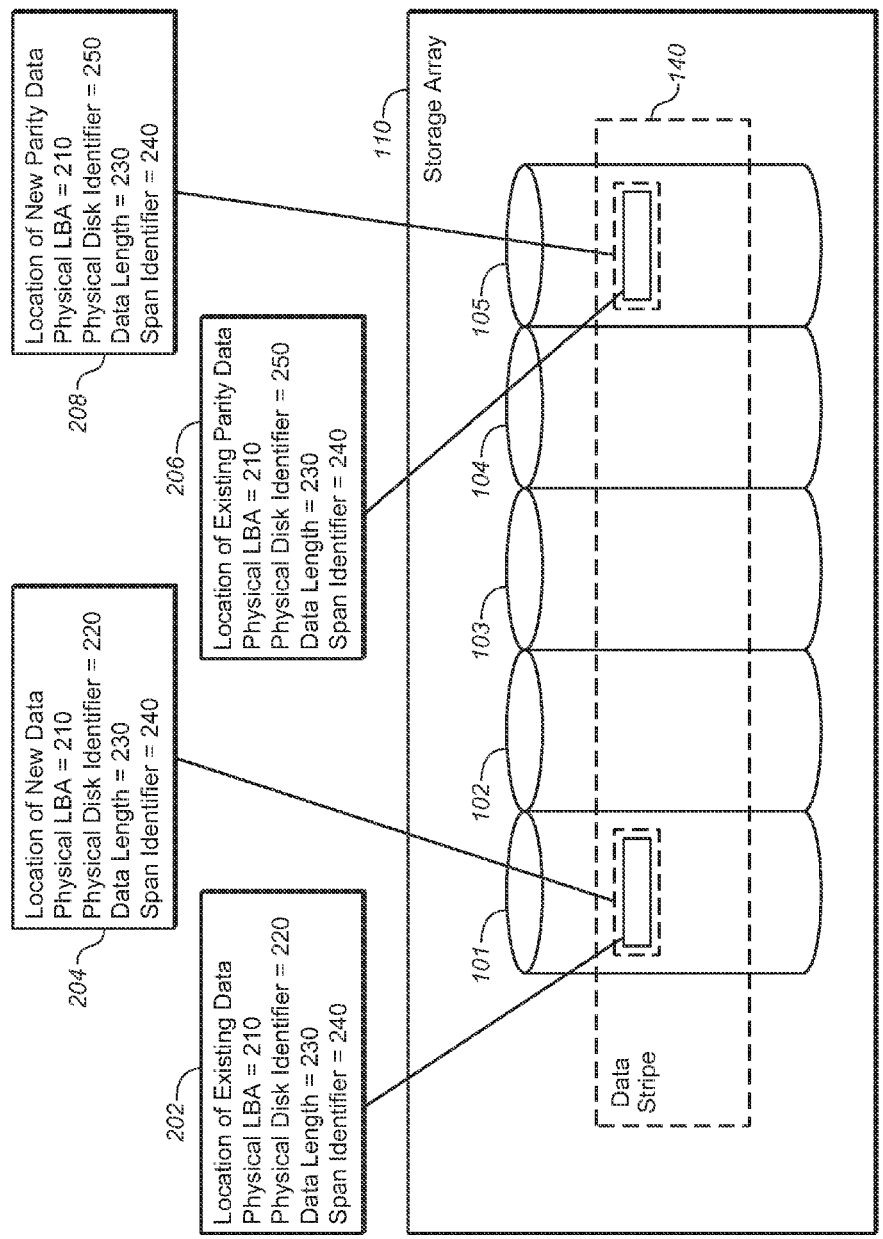
FIG. 2 is block diagram of a RAID storage array including location parameters utilized in accordance with the present disclosure.

Referring generally to FIG. 2, a storage array 110 with data location indicators to illustrate the efficient reuse of parameters for a data write is provided. According to a read-modify-write (RMW) method of performing a data write within storage array 110 (ex—a disk array in a RAID-5 configuration), the existing data which is to be replaced by new data and the existing parity data corresponding to the existing data must first be read. In order to read this data, an individual command frame may be issued to the storage array 110 for each set of data. A data write request to storage system 100 may include a virtual Logical Block Address (LBA) corresponding to location 130 within the storage array. Storage system 100 may utilize the virtual LBA to calculate one or more of a physical LBA 210, a physical disk identifier 220 corresponding to location 130, and a data length 230 corresponding to length of the new data. In addition, storage system 100 may utilize the virtual LBA to calculate a span identifier 240 corresponding to location 130 if a span identifier is required by the configuration of storage array 110. In addition, a storage system 100 may utilize the virtual LBA to calculate a disk identifier 250 corresponding to the existing parity data corresponding to location 130.

The parameters of physical LBA 210, physical disk identifier 220, data length 230, and span identifier 240 may identify the location 202 of the existing data within storage array 110. Similarly, the parameters of physical LBA 210, physical disk identifier 220, data length 230, and span identifier 240 may identify the requested location 204 of the new data within storage array 110. The parameters of physical LBA 210, physical disk identifier 250, data length 230, and span identifier 240 may identify the location 206 of the existing parity data within storage array 110. Similarly, the parameters of physical LBA 210, physical disk identifier 250, data length 230, and span identifier 240 may identify the desired location 208 of the new parity data within storage array 110.

Storage system 100 may utilize one or more of the calculated physical LBA 210, the calculated physical disk identifier 220 corresponding to location 130, the data length 230, and the calculated span identifier 240 to create a command frame to issue to the storage array 110 to retrieve the existing data. Storage system 100 may utilize one or more of the calculated physical LBA 210, the calculated physical disk identifier 250 corresponding to the existing parity data, the data length 230, and the calculated span identifier 240 to create a command frame to issue to the storage array 110 to retrieve the existing parity data. Because the values are identical, storage system 100 may reuse one or more of the calculated physical LBA 210, the data length 230, and the calculated span identifier 240 without recalculation. Storage system 100 may issue the command frames in parallel. In another embodiment, storage system 100 may issue the command frames in series.

Storage system 100 may utilize the contiguous buffer 150 to calculate new parity data. For example, storage system 100 may calculate the new parity data via performing a bitwise Exclusive-OR (XOR) operation on the new data, the existing data, and the existing parity data. Storage system 100 may store the new parity data within contiguous buffer 150. After calculating the new parity data, storage system 100 may issue a command frame to the storage array 110 to write the new data. In addition, storage system 100 may issue a command frame to the storage array 110 to write the new parity data. Because the storage system 100 writes the new data to the same location (ex—parameters 202 are identical to parameters 204) as the existing data, storage system 100 may reuse the command frame issued to the storage array 110 to retrieve the existing data as the command frame issued to the storage array 110 to write the new data. Additionally, because the storage system 100 writes the new parity data to the same location (ex—parameters 206 are identical to parameters 208) as the existing parity data, storage system 100 may reuse the command frame issued to the storage array 110 to retrieve the existing parity data as the command frame issued to the storage array 110 to write the new parity data.

Referring generally to FIGS. 1 and 2, storage system 100 may alter the command frames issued to the storage array 110 to retrieve data in order to reuse the command frames to write data to storage array 110. For example, the command frames may include a field for identifying the purpose of the command frame (ex—a Command Descriptor Block (CDB)). Storage system 100 may alter the field from a field for a request command frame to a field for a write command frame. Storage system 100 may issue the altered command frames in parallel. In another embodiment, storage system 100 may issue the altered command frames in series.

Storage system 100 may write the new data to storage array 110 via issuing the altered command frame previously utilized to retrieve the existing data. Further, storage system 100 may issue the new data in addition to the altered command frame previously utilized to retrieve the existing data. Storage system 100 may write the new parity data to storage array 110 via issuing the altered command frame previously utilized to retrieve the existing parity data. Further, storage system 100 may issue the new parity data in addition to the altered command frame previously utilized to retrieve the existing parity data. Storage system 100 may include a processor 160 operably coupled to system memory 125 and storage array 110 for performing the calculations and operations required to perform the data write operation.

Figure 3:
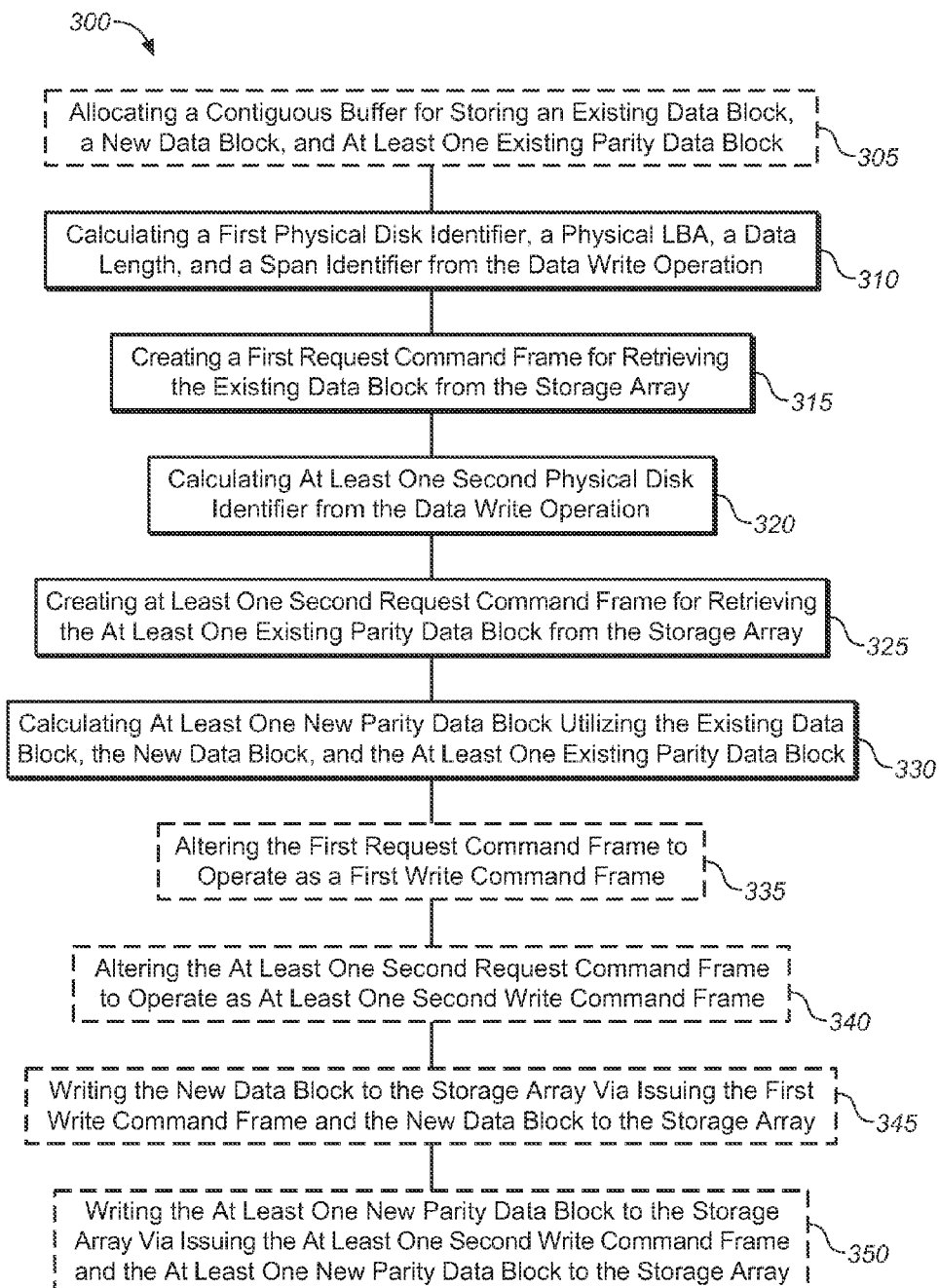
FIG. 3 is a flowchart diagram of a method of performing a data write operation in a RAID storage system in accordance with the present disclosure.

Referring generally to FIG. 3, a flowchart illustrating a method for performing a data write operation in a storage array (ex—storage array 110) utilizing a RAID configuration with parity information 300 is shown. For example, storage system 100 of FIG. 1 may be configured to perform the method 300. The method 300 may include a block 305 representing allocating a contiguous buffer 150 for storing an existing data block, a new data block, and at least one existing parity data block. For example, processor 160 may allocate contiguous buffer 150 within write through buffer 120. The size of contiguous buffer 150 may equal the product of the number of buffers required for a data write and the size of the data write. The method 300 may further include a block 310 representing calculating a first physical disk identifier, a physical LBA, a data size, and a span identifier from the data write operation. For example, the data write operation may include a virtual LBA of storage array 110. Processor 160 may utilize the virtual LBA of the data write operation to calculate one or more of a first physical disk identifier, a physical LBA, a data size, and a span identifier. Processor 160 may not calculate one or more parameters if storage array 110 is not configured to utilize such parameters.

The method 300 may further include a block 315 representing creating a first request command frame for retrieving the existing data block from the storage array 110. For example, processor 160 may create a first request command frame. The method 300 may further include a block 320 representing calculating at least one second disk identifier from the data write operation. For example, processor 160 may calculate the at least one second disk identifier from the data write operation.

The method 300 may further include a block 325 representing creating at least one second request command frame for retrieving the at least one existing parity data block from the storage array. For example, processor 160 may reuse previously calculated parameters (ex—parameters calculated in block 310). The method 300 may further include a block 330 representing calculating at least one new parity data block utilizing the existing data block, the new data block, and the at least one existing parity data block. For example, processor 160 may calculate at least one new parity data block utilizing the existing data block, the new data block, and the at least one existing parity data block via performing a bitwise XOR operation on the new data block, the existing data block, and the existing parity data block.

The method 300 may further include a block 335 representing altering the first request command frame to operate as a first write command frame. For example, altering the first request command frame may include changing a field (ex—a CDB) of the first request command frame from a field for a request command to a field for a write command. The method 300 may further include a block 340 representing altering the at least one second request command frame to operate as at least one second write command frame. For example, altering the first request command frame may include changing at least one field (ex—at least one CDB) of the at least one second request command frame from at least one field for a request command to at least one field for a write command. Processor 160 may alter one or more of the first request command frame or at least one second request command frame. The method 300 may further include a block 345 representing writing the new data block to the storage array 110 via issuing the first write command frame and the new data block to the storage array 110. The method 300 may further include a block 350 representing writing the at least one new parity data block to the storage array via issuing the at least one second write command frame and the at least one new parity data block to the storage array 110. In an embodiment, processor 160 may perform the steps of block 345 and 350 in parallel.

Figure 4:
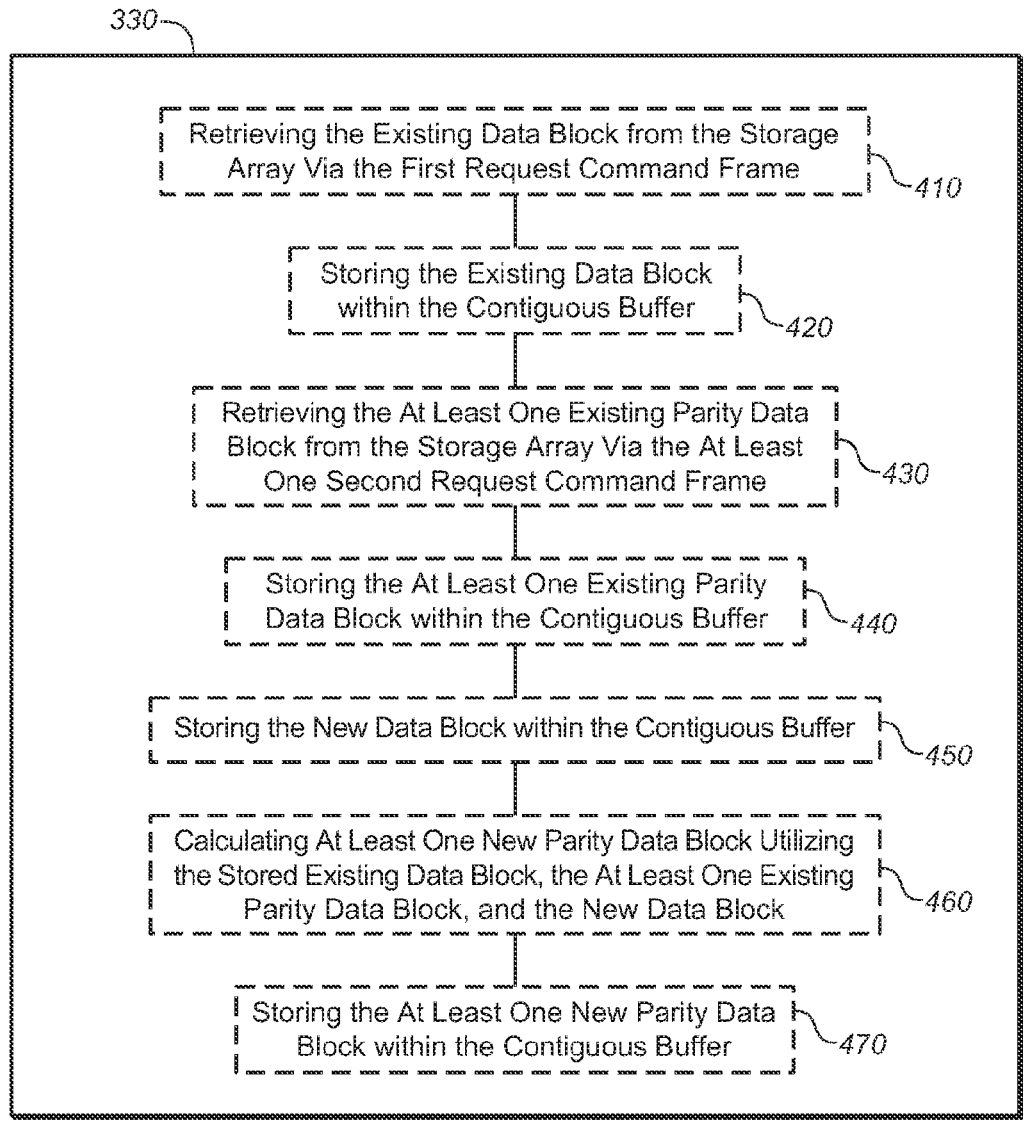
FIG. 4 is a flowchart diagram further detailing the flowchart diagram of FIG. 3 in accordance with the present disclosure.

Referring generally to FIG. 4, a flowchart illustrating further steps included within block 330 of FIG. 3. Block 330 may further include a block 410 representing retrieving the existing data block from the storage array via the first request command frame. For example, processor 160 may issue the first request command frame to storage array 110. Block 330 may further include a block 420 representing storing the existing data block within the contiguous buffer 150. Block 330 may further include a block 430 representing retrieving the at least one existing parity data block from the storage array via the at least one second request command frame. For example, processor 160 may issue the second request command frame to storage array 110. Block 330 may further include a block 440 representing storing the at least one existing parity data block within the contiguous buffer. Block 330 may further include a block 450 representing storing the new data block within the contiguous buffer. Block 330 may further include a block 460 representing calculating at least one new parity data block utilizing the stored existing data block, the at least one existing parity data block, and the new data block. For example, in a RAID-5 array, processor 160 may calculate the at least one new parity data block via performing a bitwise XOR operation on the new data, the existing data, and the existing parity data. Block 330 may further include a block 470 representing storing the at least one new parity data block within the contiguous buffer.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for performing a data write operation in a storage array utilizing a Redundant Array of Independent Disks (RAID) configuration with parity information, comprising:
   calculating a first physical disk identifier, a physical Logical Block Address (LBA), a data length, and a span identifier from the data write operation;
   creating a first request command frame for retrieving an existing data block from the storage array, the first request command frame including at least one of the calculated first physical disk identifier, the calculated physical LBA, the calculated data length, and the calculated span identifier;
   calculating at least one second physical disk identifier from the data write operation;
   creating at least one second request command frame for retrieving at least one existing parity data block from the storage array, the at least one second request command frame including the calculated at least one second physical disk identifier and at least one of the calculated physical LBA, the calculated data size, or the calculated span identifier;
   calculating at least one new parity data block utilizing the existing data block, a new data block, and the at least one existing parity data block;
   altering the first request command frame to operate as a first write command frame; and
   altering the at least one second request command frame to operate as at least one second write command frame.

2. The method of claim 1, further comprising:
   allocating a contiguous buffer for storing the existing data block, the new data block, and the at least one existing parity data block.

3. The method of claim 2, wherein the contiguous buffer is allocated a size substantially equivalent to a sum of a size of the new data block, a size of the existing data block, and a size of the at least one existing parity block.

4. The method of claim 2, wherein calculating at least one new parity data block utilizing the existing data block, the new data block, and the at least one existing parity data block includes:
   retrieving the existing data block from the storage array via the first request command frame;
   storing the existing data block within the contiguous buffer;
   retrieving the at least one existing parity data block from the storage array via the at least one second request command frame;
   storing the at least one existing parity data block within the contiguous buffer;
   storing the new data block within the contiguous buffer;
   calculating at least one new parity data block utilizing the stored existing data block, the at least one existing parity data block, and the new data block; and
   storing the at least one new parity data block within the contiguous buffer.

5. The method of claim 1, further including:
   writing the new data block to the storage array via issuing the first write command frame and the new data block to the storage array; and
   writing the at least one new parity data block to the storage array via issuing the at least one second write command frame and the at least one new parity data block to the storage array.

6. The method of claim 1, wherein altering the first request command frame to operate as a first write command frame includes:
   changing a Command Descriptor Block (CDB) of the first request command frame from a CDB for a request command to a CDB for a write command; and
   wherein altering the at least one second request command frame to operate as at least one second write command frame includes:
   changing at least one CDB of the at least one second request command frame from at least one CDB for a request command to at least one CDB for a write command.

7. A system for performing a data write operation in a storage array utilizing a Redundant Array of Independent Disks (RAID) configuration with parity information, comprising:
   means for calculating a first physical disk identifier, a physical Logical Block Address (LBA), a data size, and a span identifier from the data write operation;
   means for creating a first request command frame for retrieving an existing data block from the storage array, the first request command frame including at least one of the calculated first physical disk identifier, the calculated physical LBA, the calculated data size, and the calculated span identifier;
   means for calculating at least one second physical disk identifier from the data write operation;
   means for creating at least one second request command frame for retrieving at least one existing parity data block from the storage array, the at least one second request command frame including the calculated at least one second physical disk identifier and at least one of the calculated physical LBA, the calculated data size, or the calculated span identifier;
   means for calculating at least one new parity data block utilizing the existing data block, a new data block, and the at least one existing parity data block;
   means for altering the first request command frame to operate as a first write command frame; and
   means for altering the at least one second request command frame to operate as at least one second write command frame.

8. The system of claim 7, further comprising:
   means for allocating a contiguous buffer for storing the existing data block, the new data block, and the at least one existing parity data block.

9. The system of claim 8, wherein the contiguous buffer is allocated a size substantially equivalent to a sum of a size of the new data block, a size of the existing data block, and a size of the at least one existing parity block.

10. The system of claim 8, wherein the means for calculating at least one new parity data block utilizing the existing data block, the new data block, and the at least one existing parity data block includes:
    means for retrieving the existing data block from the storage array via the first request command frame;

means for storing the existing data block within the contiguous buffer;

means for retrieving the at least one existing parity data block from the storage array via the at least one second request command frame;

means for storing the at least one existing parity data block within the contiguous buffer;

means for storing the new data block within the contiguous buffer;

means for calculating at least one new parity data block utilizing the stored existing data block, the at least one existing parity data block, and the new data block; and means for storing the at least one new parity data block within the contiguous buffer.

11. The system of claim 7, further including:

means for writing the new data block to the storage array via issuing the first write command frame and the new data block to the storage array; and means for writing the at least one new parity data block to the storage array via issuing the at least one second write command frame and the at least one new parity data block to the storage array.

12. The system of claim 7, wherein the means for altering the first request command frame to operate as a first write command frame includes:

means for changing a Command Descriptor Block (CDB) of the first request command frame from a CDB for a request command to a CDB for a write command; and wherein the means for altering the at least one second request command frame to operate as at least one second write command frame includes:

means for changing at least one CDB of the at least one second request command frame from at least one CDB for a request command to at least one CDB for a write command.

13. A non-transitory computer-readable medium having computer-executable instructions for performing a method for performing a data write operation in a storage array utilizing a Redundant Array of Independent Disks (RAID) configuration with parity information, the method comprising:

calculating a first physical disk identifier, a physical Logical Block Address (LBA), a data size, and a span identifier from the data write operation;

creating a first request command frame for retrieving an existing data block from the storage array, the first request command frame including at least one of the calculated first physical disk identifier, the calculated physical LBA, the calculated data size, and the calculated span identifier;

calculating at least one second physical disk identifier from the data write operation;

creating at least one second request command frame for retrieving at least one existing parity data block from the storage array, the at least one second request command frame including the calculated at least one second physical disk identifier and at least one of the calculated physical LBA, the calculated data size, or the calculated span identifier;

calculating at least one new parity data block utilizing the existing data block, a new data block, and the at least one existing parity data block;

altering the first request command frame to operate as a first write command frame; and altering the at least one second request command frame to operate as at least one second write command frame.

14. The non-transitory computer-readable medium of claim 13, the method further comprising:

allocating a contiguous buffer for storing the existing data block, the new data block, and the at least one existing parity data block.

15. The non-transitory computer-readable medium of claim 14, wherein the contiguous buffer is allocated a size substantially equivalent to a sum of a size of the new data block, a size of the existing data block, and a size of the at least one existing parity block.

16. The non-transitory computer-readable medium of claim 14, wherein calculating at least one new parity data block utilizing the existing data block, the new data block, and the at least one existing parity data block includes:

retrieving the existing data block from the storage array via the first request command frame;

storing the existing data block within the contiguous buffer;

retrieving the at least one existing parity data block from the storage array via the at least one second request command frame;

storing the at least one existing parity data block within the contiguous buffer;

storing the new data block within the contiguous buffer;

calculating at least one new parity data block utilizing the stored existing data block, the at least one existing parity data block, and the new data block; and storing the at least one new parity data block within the contiguous buffer.

17. The non-transitory computer-readable medium of claim 13, the method further including:

writing the new data block to the storage array via issuing the first write command frame and the new data block to the storage array; and writing the at least one new parity data block to the storage array via issuing the at least one second write command frame and the at least one new parity data block to the storage array.

18. The non-transitory computer-readable medium of claim 13, wherein altering the first request command frame to operate as a first write command frame includes:

changing a Command Descriptor Block (CDB) of the first request command frame from a CDB for a request command to a CDB for a write command; and wherein altering the at least one second request command frame to operate as at least one second write command frame includes:

changing at least one CDB of the at least one second request command frame from at least one CDB for a request command to at least one CDB for a write command.

* * * * *